Oct. 26, 1965   P. SPENCE   3,213,875
AUTOMATIC CHANGEOVER SYSTEM
Filed Feb. 21, 1962   3 Sheets-Sheet 1

INVENTOR
PAULSEN SPENCE, DECEASED
By LEON B. DEXTER &
   OTTO C. PAULSEN, EXECUTORS
BY
Roy C. Hapgood
ATTORNEY

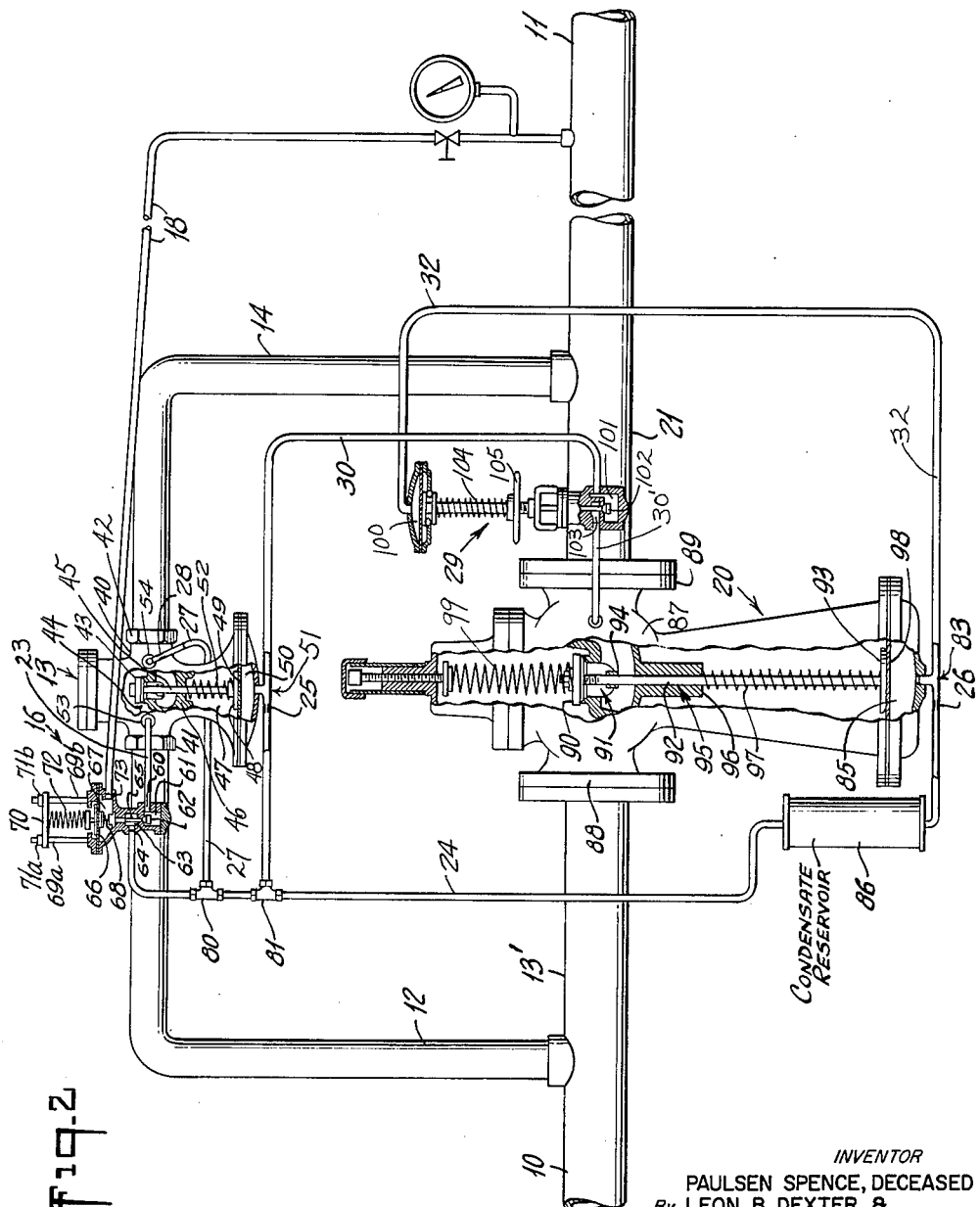

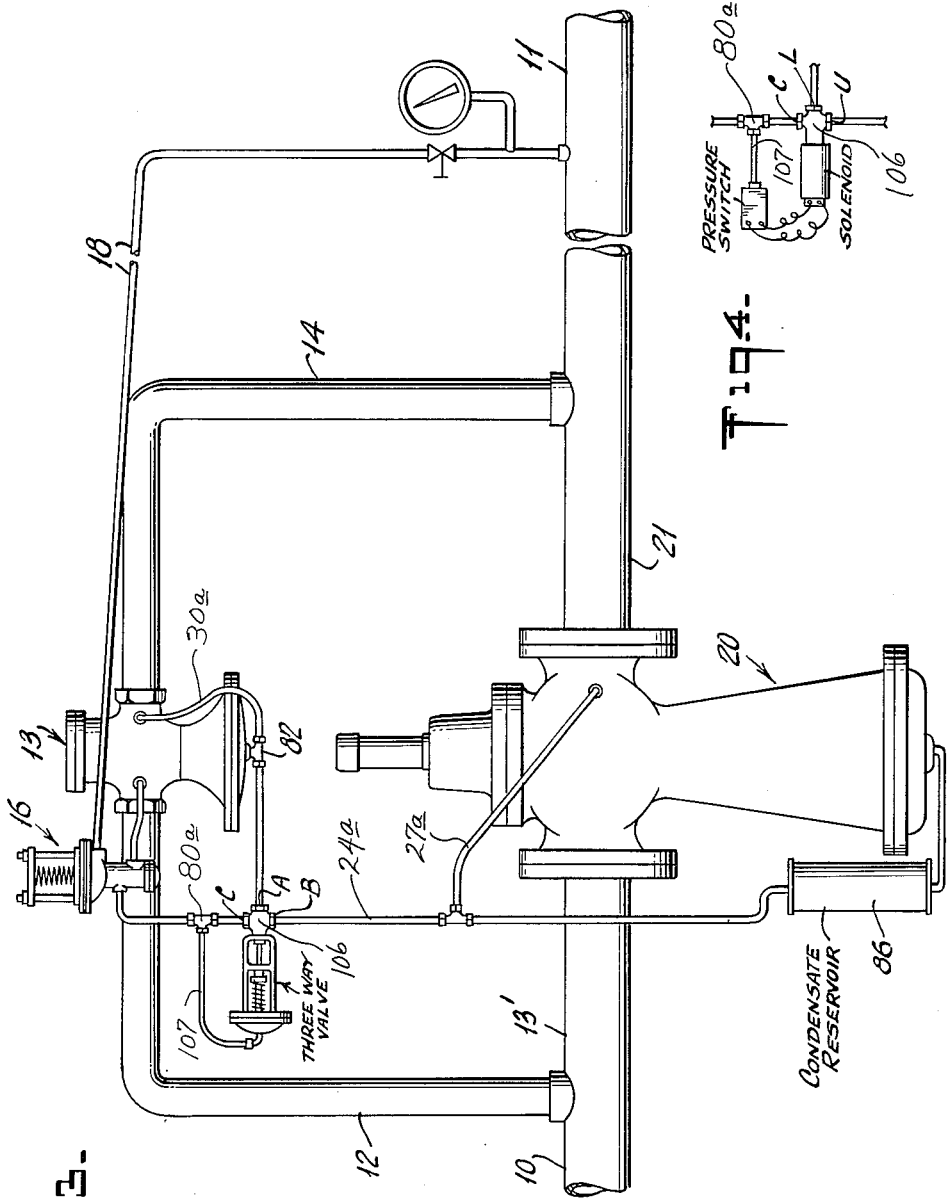

3,213,875
AUTOMATIC CHANGEOVER SYSTEM
Paulsen Spence, deceased, late of Baton Rouge, La., by Leon B. Dexter, Newburgh, N.Y., and Otto C. Paulsen, Baton Rouge, La., executors, assignors to Spence Engineering Company, Inc., Walden, N.Y., a corporation of New York
Filed Feb. 21, 1962, Ser. No. 174,920
2 Claims. (Cl. 137—110)

This invention, generally, relates to automatic fluid pressure control systems and, more particularly, to a new and improved automatic change-over system.

A principal object of the invention is to provide a new and improved system for changing automatically from one fluid flow control element to another for extending the range of pressure control.

It is also an object of the invention to provide an automatic change-over system which permits smooth transition and control between two fluid flow control elements.

A further object of the invention is to provide an automatic change-over system which admits of a high degree of safety.

Briefly, a change-over system in accordance with the principles of the invention provide a first fluid flow control element or main valve which is adapted to be operative between a first range of fluid pressures. A second fluid flow control element is adapted to be operative between a second range of fluid pressure which is different from the first range, and means are provided to connect the first and second control elements into a fluid flow circuit so that fluid flow is controlled selectively by the first and second control element. The invention uniquely permits a single control pilot element responsive to a fluid control pressure to shift the control selectively between the first and second control element.

More specifically, an illustrative form of the invention embodies two main control valves connected in parallel circuits, one main valve having a lower pressure control range and the other main valve having a higher range. One pilot valve is connected to be responsive to pressure at a point where pressure control is desired, and this pilot valve controls the valve-operating pressure to one or the other of the main valves, depending upon the demand characteristics of the system.

With these and other objects in view, the nature of which will become more apparent, the invention will be more fully understood by reference to the drawings, the accompanying detailed description, and the appended claims.

In the drawings:

FIG. 2 is a view in elevation, partly in section, of one form of the invention;

FIG. 3 is a view similar to FIG. 2 showing a modification in accordance with the invention; and FIG. 4 shows a modified control for the three way valve shown in FIG. 3.

Figure 1:
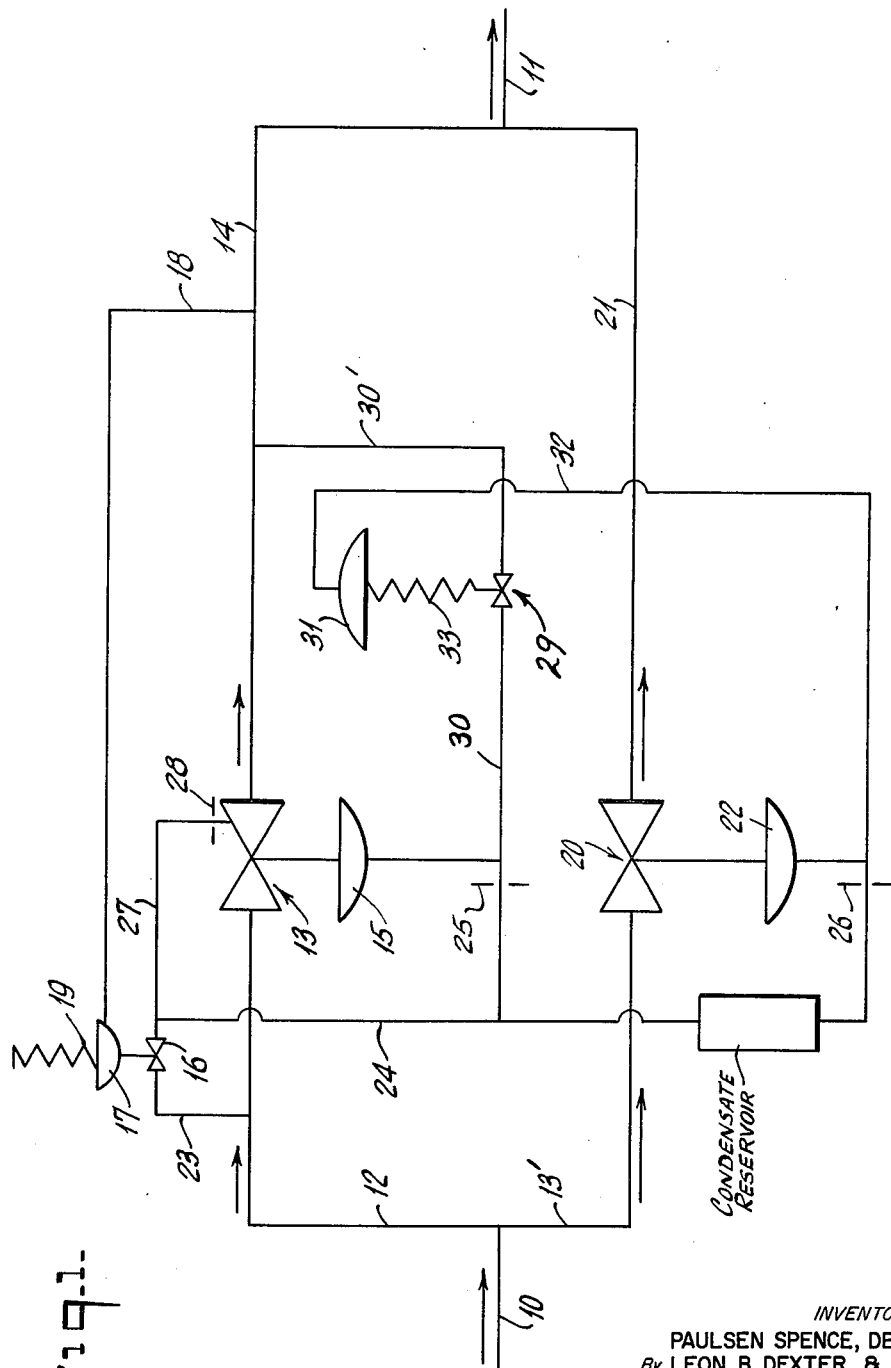
FIG. 1 is a circuit connection diagram showing fluid connections between the respective component parts of a pressure reducing station for automatic change-over.

Referring now to FIG. 1 of the drawings, a connection 10 provides means for connecting the automatic change-over system to a fluid pressure supply, and a connection 11 provides means for connecting the system to a fluid pressure load. From the input connection 10, a fluid flow may be directed selectively between conduits 12 and 13'.

The conduit 12 is connected through a main valve or control element 13 and through a conduit 14 to the load connection 11. A diaphragm 15 actuates the valve 13 and provides an element of control for the valve 13.

A pilot valve or control element 16 is connected between the high and the low pressure sides of the main valve 13, and a diaphragm 17, responsive to fluid pressure at a preselected point 18 at which the pressure of the demand or load is desired provides a reference by which the pilot valve 16 is actuated.

A spring 19, when tightened, maintains the valve 16 normally open.

The conduit 13' passes through a second main valve or fluid flow control element 20 and through a connection 21 to the load connection 11. A diaphragm 22 provides a control means for the valve 20 as is customary. Both of the main valves 13 and 20 are normally closed.

Control fluid for operating the diaphragms 15 and 22 is obtained through a connection 23 to the high pressure side of the system.

From the valve 16, a connection 24 leads to both the diaphragm 15 and the diaphragm 22 through restriction orifices 25 and 26, respectively. A connection 27 from the valve 16 to the low pressure side of the valve 13 through a bleed port 28 provides a bleed for the pressure in the connection 24.

A second pilot valve 29 is normally closed and, when open, vents the pressure on the diaphragm 15 through a connection 30 to the low pressure conduit 14, and prevents the opening of the valve 13. Control for the valve 29 is obtained through a diaphragm 31 responsive to pressure in conduit 32 from the same source as the diaphragm 22. A spring 33 is set to calibrate the valve 29 for opening at a point when both the valves 13 and 20 are open.

To describe the operation of the system briefly in reference to FIG. 1, assume that the system is shut down and pressure is beginning to be supplied through the supply connection 10. The pressure through the conduits 12 and 13' will meet closed valves 13 and 20. The valve 16, initially, is closed also, and to start the system, the spring 19 is adjusted to open the valve 16, permitting fluid to flow through the conduit 23 and into the control conduit 24.

Some fluid is bled off through the conduit 27, but the pressure of the fluid will build up in the conduit 24 because of the flow restriction at the port 28, and since the valve 29 is closed, the pressure will build up under the diaphragms 15 and 22. Assuming that the valve 13 is calibrated for operation at lower pressures than the valve 20, the valve 13 will begin to open first.

As the valve 13 opens, pressure is supplied through conduit 14 to the output connection 11 to satisfy the demand or load. The control pressure through the conduit 23 and the conduit 24 will continue to open the valve 13 until a pressure develops in the load conduit 11 which is reflected in the conduit 14 and through the connection 18 to affect the diaphragm 17, tending to close the valve 16 against the action of spring 19. At this point, the operation will become stable.

If the load requirements decrease, the pressure in the output 11 will increase. This will be reflected back through the connection 18 to the diaphragm 17, closing the valve 16 to decrease the pressure in the conduit 24 and permitting the valve 13 to close slightly. This restores the pressure in the output connection 11.

Assume, however, that the demand or load increases. Then the pressure in the connection 11 will drop, and this drop is reflected in a decreased pressure back through the connection 18 and to decrease the pressure under the diaphragm 17, causing the pilot valve 16 to open further. As a result, the fluid pressure in the control line 24 increases and causes the valve 13 to open further, reestablishing the pressure in the output connection 11.

Now, assume that the load or demand continues to increase, and that the valve 13 becomes wide open. If the load increases further, the valve 13 will be unable to bring the pressure in the output connection 11 up to the desired value.

However, at the upper limit of the valve 13, the pressure in the control line 24 will reach the preset value at which the diaphragm 22 becomes responsive, and the valve 20 begins to open. At this point, fluid pressure from the source 10 is supplied both through the valve 13 and also through the valve 20 in an effort to bring the pressure in the output line 11 back to the predetermined value.

If the demand or load still is not satisfied, the pressure in the control line 24 and through the connection 32 will open the valve 29 to relieve the pressure under the diaphragm 15 through the connections 30 and 30' to the low pressure side of the system. The result of this action as to close the valve 13. The valve 29, therefore, operates to close the valve 13 after the valve 20 has been opened as determined by the setting of the spring 33.

With the valve 20 now in operation after a smooth transition from the valve 13, fluid pressure through the connection 23, pilot valve 16 and control line 24 now acts upon the diaphragm 22 of the larger main valve 20 and pressure in the output connection 11 now is controlled to a higher value.

Assume that the load or demand drops off, and the pressure in the output connection 11 begins to increase. An increase in pressure in the connection 11 is reflected back through the connection 18 to the diaphragm 17, tending to close the valve 16. Closing of the valve 16 decreases the pressure in the line 24 since it bleeds off through the bleed port 28, and the decrease in pressure beneath the diaphragm 22 causes the valve 20 to move toward closed.

As the pressure continues to be high in the output connection 11, the valve 20 will continue to close until it reaches the point at which the pressure in the control pressure line 24 acting against the diaphragm 31 is not sufficient to keep the valve 29 open; so the valve 29 closes. The pressure under the diaphragm 15 now will build up, opening the valve 13 to its maximum.

As the control continues in a downward direction, the value of the pressure in the control line 24 reaches a lower point at which the diaphragm 22 permits the valve 20 to close altogether, and the pressure in the line 24 acting against the diaphragm 15 will have the valve 13 open to its fullest extent at this value of pressure. Thus, the transition again is effected smoothly from the larger valve 20 to the smaller valve 13.

Referring now to a specific automatic change-over system as illustrated in FIG. 2, a smaller main valve 13 includes a body 40 having in-flow and out-flow connections 41 and 42, respectively. Between the in and out connections 41 and 42, a valve 43 is positioned to control the opening of a valve port 44.

To operate the valve member 43, a valve stem 45 is connected at one end to the valve member 43 and extends through a guide member 46 into a lower chamber 47, at which point the stem 45 terminates at a pressure plate 48. Since the member 46 is merely a guide for the stem 45, the opening therethrough does not fit too closely, and therefore, fluid pressure may be communicated readily therethrough into the chamber 47.

A diaphragm 49 extends across the lower end of the chamber 47 to form another chamber 50. A connection 51 provides means for connecting fluid pressure to the chamber 50 for acting against the diaphragm 49 and, thereby, effecting movement of the valve stem 45.

The valve member 43 is normally closed due to the action of a spring 52, and any pressure in the chamber 50 must first overcome the tension in the spring 52 before moving the valve 43. In practice, however, a relatively small pressure may be required in the chamber 50; a pressure in the order of 2 pounds is illustrative of the magnitude which may be sufficient.

Relatively small openings 53 and 54 are formed in the housing 40, the opening 53 being located on the input or high pressure side of the valve 43 and the opening 54 being located on the downstream or low pressure side. As will be explained, fluid pressure to control the operation of the system is obtained by means of these openings 53 and 54.

A pilot valve 16 has an opening 60 for connecting a chamber 61 to the opening 53 by means of the conduit 23. A valve member 62 is interposed between the chamber 61 and another chamber 63 which is communicated by means of an opening 64 to the opening 54 in the valve body 40 by means of connection 27.

The valve member 62 is attached at the lower end of a valve stem 65 which extends up to act against a diaphragm 66 extending across a chamber 67. A spring 68 in the chamber 67 urges the diaphragm 66 upwardly and, therefore, makes the valve 16 normally closed.

However, a structure 69a and 69b is positioned on the upper part of the valve 16 to permit a yoke member 70 to be movable vertically by adjusting threaded nuts 71a and 71b. A spring 72 is in compression between the yoke member 70 and the upper part of the diaphragm 66.

Therefore, by tightening the nuts 71a and 71b and applying compression to the spring 72, the spring 68 is overridden and the valve member 62 is opened. Under these conditions, a pressure applied through a connection means 73 to the chamber 67 acts to override the spring 72 and move the valve member 62 toward its closed position. Clearly, movement of the valve member 62 controls the flow of a fluid between the chambers 61 and 63, as will be explained, however, in greater detail presently.

The position of the valve member 62 is controlled by the pressure of the fluid in the chamber 67 which is obtained from a point where pressure control is desired, as indicated by the location 18 in FIG. 1.

From the opening 64, a T-connection 80 provides a junction between conduit 27 and the control pressure conduit 24. It should be noted that a bleed port 28 is located at or adjacent the opening 54 in the conduit 27. By this means, pressure obtained from conduit 23 on the upstream or high pressure side of the system provides a control fluid pressure in the conduit 24.

The control fluid pressure conduit 24 has another T-connection 81 to divide its control pressure between chamber 50 for the valve 13 and a chamber 85 in the valve 20. T-connections 51 and 83 are located, respectively, just outside the chambers 50 and 85, and restriction orifices 25 and 26 are provided at these T-connections 51 and 83, respectively, just to the left as viewed in FIG. 2, the purpose of which will be understood readily by one skilled in the art.

A condensate reservoir 86 is located in the lower portion of the control fluid conduit 24 to ensure that a liquid level is maintained in the chamber 85. The restriction orifice in the connection 83, therefore, provides a damping effect and avoids sudden changes of the pressure in the chamber 85.

The valve 20 has a body 87 formed with a high pressure side 88 and a lower pressure side 89. A valve member 90 is positioned to control the opening of a valve port 91 between the two sides 88 and 89.

A valve stem 92 connects the valve member 90 at one end with a pressure plate 93 at the opposite end. Similar to the valve 13, the valve stem 92 in the valve 20 is guided by a member 94 and an opening 95. An additional guide member 96 may be used and, also, provides a lower abutment surface against which a spring 97 may act to apply a downward force against the pressure plate 93 and a diaphragm 98.

It may be seen from this construction of the valve 20 that it would be normally closed by the tension in the spring 97, and that a fluid pressure in chamber 85 would tend to open the valve depending upon the effect of the spring 97. If desired, a second spring 99 may be mounted to supplement the action of the spring 97 and provide a ready means to adjust (or calibrate) the operation of valve 20 without having to disassemble the valve body.

As described previously, the valve 29 functions to disable the valve 13 to prevent the valve 13 from opening when control of the fluid is handled by the valve 20. As pressure in the chamber 85 of the valve 20 achieves a sufficient magnitude to control the valve 20, the pressure in the connection 32, and thus in the chamber 100 of the valve 29, would be sufficient to open the valve 29. As illustrated in the partial cross-sectional view of the valve 29 in FIG. 2, the connection 30 communicates with a chamber 101 and a valve member 102 controls the amount of communication between the chamber 101 and a chamber 103 with which connection 30′ is connected. A spring 104 is adjustable in tension or compression as determined by a rotatable wheel 105 to control the exact pressure in the chamber 100 at which the valve member 102 will open.

For smooth transition of control between the valves 13 and 20, it is prefered that the valve 29 open when both the valves 13 and 20 are open. When the valve 29 is opened, the fluid pressure in chamber 50 of the valve 13 is vented through connections 30 and 30′ to the low pressure side of the system, thus preventing tre valve 13 from opening.

The arrangement shown in FIG. 3 of the drawings is substantially identical with that shown in FIG. 2 with the exception that the valve 29 has been eliminated and a three-way valve 106 has ben substituted. The control pressure from the valve 16 is directed into the connection 24a similarly as described in connection with FIG. 2. However, this control pressure in the conduit 24a is directed either to the T-connection 82 or to the condensate reservoir 86, dependent upon the action of the three-way valve 106, which, in turn, is controlled by the magnitude of the pressure in the conduit 24a through a connection 107.

The fluid pressure at the T-connection 82 is bled downstream through a connection 30a, and the pressure in the connection 24a is bled downstream also by means of connection 27a, similarly as before. Otherwise, the operation of the system shown in FIG. 3 is identical with that shown in FIG. 2.

If desired, the fluid connection 107 may be supplemented by adding a pressure switch, see FIG. 4 of the drawings. The pressure switch may, in turn, be used to actuate a solenoid for controlling the three-way valve 106, as will be understood.

Obviously, many modifications and variations of the present invention are possible in the light of the above teachings. Therefore, it is to be understood that the invention is not limited in its applications to the details of construction and arrangement of parts specifically described or illustrated, and that within the scope of the appended claims it may be practiced otherwise than as specifically described or illustrated.

What is claimed is:

1. An automatic change-over system to control the flow of fluid within preestablished pressure limits comprising
   an input line;
   an output line;
   first main valve means connected between said lines;
   said first valve means having a first control diaphragm;
   pilot valve means for said first main valve means connected to said input line and the output end of said first valve means and having a biased control diaphragm;
   connecting means connected to the output end of said pilot valve means to allow fluid flow to said first control diaphragm,
   means connecting the output line to said biased control diaphragm to open said pilot valve when the pressure in the output line decreases and to close said pilot valve when the pressure in the output line increases,
   whereby when the load on the output line increases, the resulting output pressure drop causes the pilot valve to open causing greater fluid flow of the first control diaphragm to open said first valve means to increase the fluid flow and pressure to the output line,
   said first valve means being operable only for a first range of pressure,
   second valve means operable over a second range of pressures which range begins approximately at the upper end of said first range, connected between said input and output lines in parallel with said first main valve means, said second valve means having a second control diaphragm;
   a first branch line connection to the output end of said pilot valve means and said connecting means to allow fluid flow to said second control diaphragm;
   a second pilot valve between said output line and the output of said first pilot valve means, whereby one end of said second pilot valve means is coupled to said branch line and said first control diaphragm,
   said second pilot valve having a diaphragm;
   and a second branch line to said diaphragm of said second pilot valve and having an input from said first branch line,
   whereby when the pressure from the output of the first pilot means increases to reflect a load beyond the first range of pressure, said second main valve means opens and the pressure applied to the diaphragm of the second pilot valve opens said second pilot valve to decrease the pressure against the diaphragm of said first main valve means to tend to close said first valve means.

2. An automatic change-over system to control the flow of a fluid within pre-established pressure limits, comprising a first fluid pressure responsive flow element operative primarily within a first portion of said pre-established limits of fluid pressure control, a second pressure element operative primarily within a second portion of said pre-established limits of pressure, the total of said first and second portions of pressure control limits including at least the range of control defined by said pre-established limits, means to connect said first and second fluid flow control elements so that a flow of fluid is controlled selectively by a predetermined one of said control elements, a first pilot valve for controlling each of said fluid flow elements, a second pilot valve for controlling only one of said fluid flow control elements during said second portion of said pre-established limits, said first pilot valve being responsive to the same fluid as that being controlled, and a control fluid pressure line to connect control fluid from said first pilot valve to each flow control element.

References Cited by the Examiner

UNITED STATES PATENTS

| 2,335,785 | 11/43 | Moore | 137—87 X |
| 2,410,876 | 11/46 | Griswold | 137—110 |
| 2,782,992 | 2/57 | Gustafson | 137—87 X |
| 2,832,367 | 4/58 | Werter | 137—112 |

WILLIAM F. O'DEA, *Primary Examiner.*

ISADOR WEIL, *Examiner.*